Dec. 15, 1936.  R. D. CARLETON  2,064,729
BOMB SUPPORT
Filed Oct. 27, 1934  2 Sheets-Sheet 1

INVENTOR.
RALPH D. CARLETON.
BY
ATTORNEYS.

Dec. 15, 1936. R. D. CARLETON 2,064,729
BOMB SUPPORT
Filed Oct. 27, 1934 2 Sheets-Sheet 2
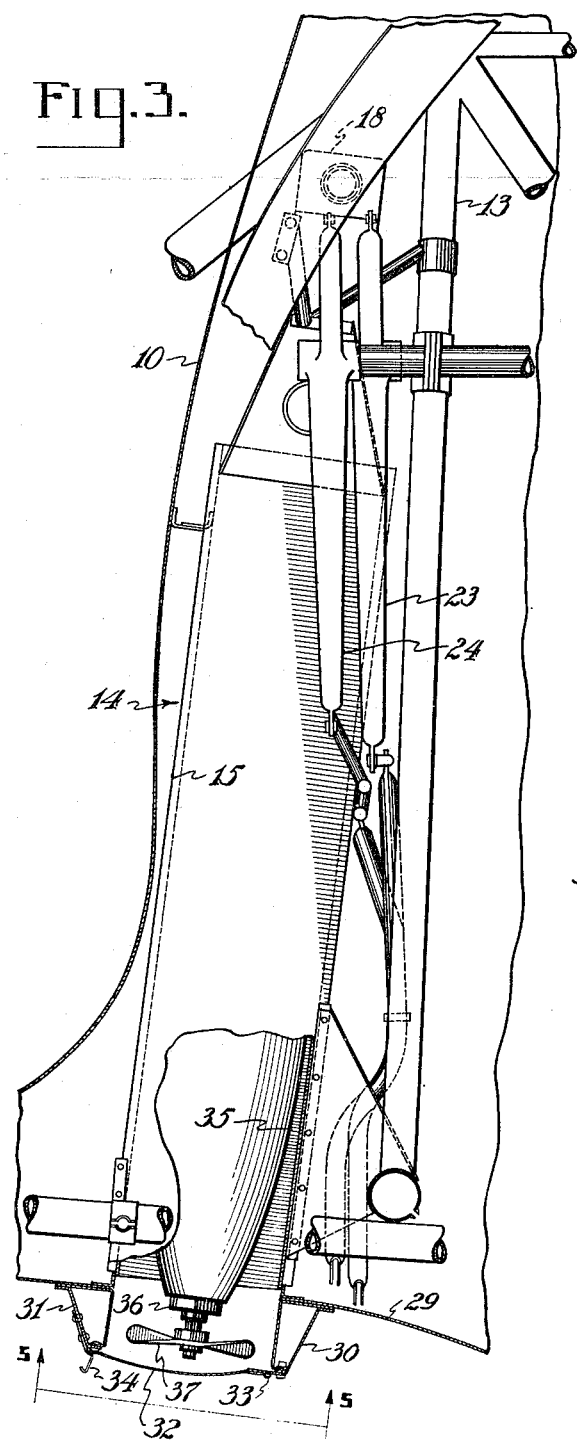
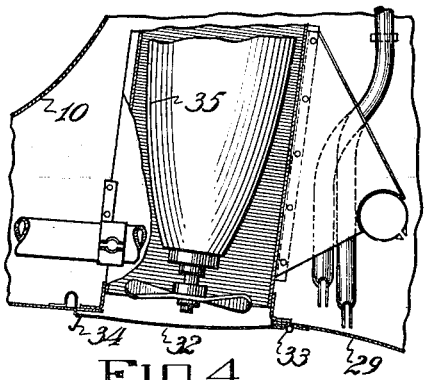
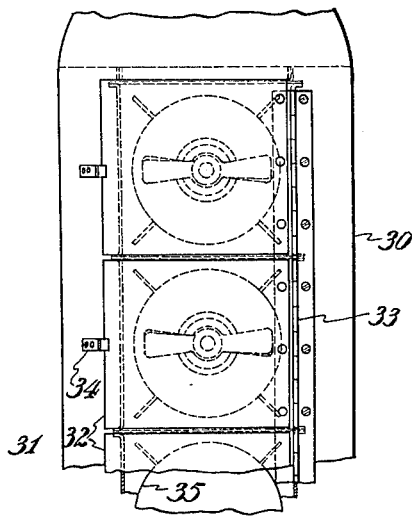
INVENTOR.
RALPH D. CARLETON.
BY
ATTORNEYS.

Patented Dec. 15, 1936

2,064,729

UNITED STATES PATENT OFFICE 2,064,729

BOMB SUPPORT

Ralph D. Carleton, Snyder, N. Y., assignor, by mesne assignments, to Curtiss-Wright Corporation, a corporation of New York Application October 27, 1934, Serial No. 750,301

2 Claims. (Cl. 89—1.5)

This invention relates to military aircraft, and is particularly concerned with improvements in the arrangements for carrying bombs in such aircraft.

Previous types of bombing aircraft were arranged to carry the bombs in a horizontal attitude with respect to the longitudinal axis of the aircraft, either in racks below the wings or in racks within the aircraft fuselage. In those aircraft in which bombs were horizontally carried within the fuselage, large bomb compartments were required so that sufficient clearance would be provided to prevent the bombs from fouling any part of the airplane as they were released, thus requiring a greater amount of fuselage space than might be desirable. In the tactical use of aircraft of this type, the bombs were dropped from a considerable altitude so that there was sufficient time for the attitude of the bombs to change from the horizontal to vertical as they descended, whereby the nose of the bomb would strike the target to cause actuation of the bomb fuse.

In recent conceptions of the tactical use of bombing aircraft, the "ground attack" has been evolved, wherein a number of small bombs are carried which are released after the aircraft has dived toward its target, when the craft is quite close to the ground. For these tactics, the airplane must be capable of high speed, and to attain this end, the fuselage of the craft must be as small and as aerodynamically clean as possible. Thus, bombs carried on external racks are undesirable, since they add to the aircraft head resistance. Also, since attacks are made close to the ground, there is insufficient time for the released bombs to assume a vertical attitude before hitting their target, so that it is distinctly advantageous to carry the bombs in a vertical position within the aircraft fuselage. It is to fulfill this requirement that the subject invention has been developed, an object of the invention being to provide bomb carrying compartments vertically disposed within an aircraft fuselage.

A further object is to provide a container for each individual bomb by which it is kept separate from the rest, and from which it may be readily released.

A further object is to provide bomb racks within an aircraft fuselage, and to provide openable covers in the fuselage surface through which the bombs may pass when released, the covers serving to maintain the outer fuselage surface in an aerodynamically clean condition during flight.

Additional objects will be appreciated in reading the annexed specification, and in viewing the drawings, in which:

Fig. 3 is an enlarged transverse section through a portion of the fuselage;

Fig. 4 is a fragmentary section through part of a bomb rack; and

Fig. 5 is a section on the line 5—5 of Fig. 3.

Figure 1:
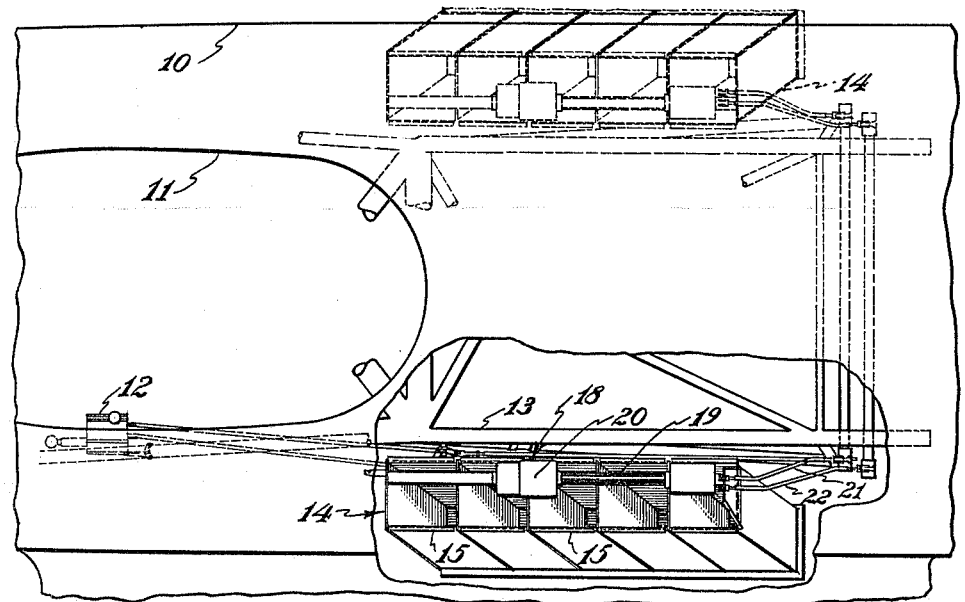
Fig. 1 is a fragmentary plan of an aircraft fuselage, partly broken away, to show the bomb racks of this invention.
Figure 2:
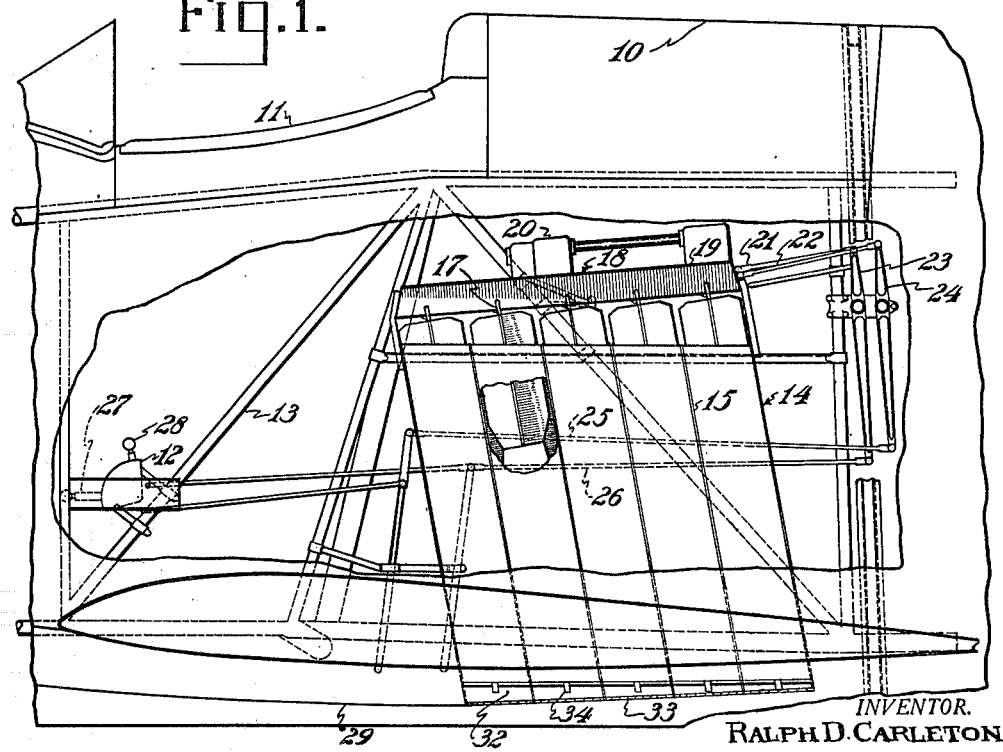
Fig. 2 is a fragmentary side elevation of an aircraft fuselage, partly broken away, to show the bomb racks.

A fuselage 10 of more or less conventional type is shown with a cockpit opening 11 having therein a bomb releasing unit 12 adapted to be operated by the bomber. On either side of the fuselage skeleton 13, between said skeleton and the skin of the fuselage, bomb containers 14 are fixedly mounted, these containers comprising a series of longitudinally aligned, vertically disposed cans 15 having open tops and open bottoms. The dimensions of the cans are such that bombs 16 of suitable size may be inserted therein from the bottom, each bomb being provided with a tail ring 17 adapted to be held by the bomb releasing mechanism 18. Said mechanism 18 is shown as comprising a rail 19 having an actuating mechanism 20. The mechanism 18 as such does not form a part of this invention, and may be of mechanically or electrically operated type, as is well known in the art. As shown, operating links 21 and 22 are connected to levers 23 and 24 respectively, pivoted to the fuselage skeleton 13. These, in turn, are connected to links 25 and 26, respectively, to operating handles 27 and 28 of the operating unit 12, whereby the bombs may be released either singly or in salvo.

As shown in Fig. 3, each of the cans 15 terminates within the lower skin 29 of the fuselage 10, projections 30 and 31 extending from the fuselage skin, these projections having a longitudinally streamlined form. A door 32 for each can 15 is spring-hinged as at 33 to the projection 30, the axis of the hinge being substantially parallel with the longitudinal axis of the fuselage, and a spring clip 34 is provided on the projection 31 to engage the free edge of the door. The clip 34 is so arranged that when a bomb 35 is released from the mechanism 18, the nose of the bomb will strike the door 32, urging it open against the spring hinge and against the clip 34, whereby the bomb may drop free. After the bomb has left its can 15, the spring hinge urges the door 32 to a closed position so that the continuity of the fuselage surface is not thereafter interrupted.

In Fig. 4 a slightly different arrangement is shown wherein the door 32 is hinged directly to the lower skin of the fuselage, the projections 30 and 31 in this case being omitted.

By the above described organization it will be seen that the bombs are carried within an aircraft fuselage to occupy an absolute minimum of space, and that they leave the aircraft when released in a vertical attitude, so that regardless of the altitude from which they may be dropped, the bomb fuse is ready to function.

The bomb fuses 36 are shown as being provided with the conventional arming propeller 37 which, as soon as the bomb is clear of the aircraft, arms the bomb in readiness for impact firing.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an aircraft fuselage, a plurality of elongated bomb containers arranged with their long axes in a substantially vertical attitude, the lower end of each container terminating substantially at the lower bounding surface of said fuselage and opening therethrough, a hinged cover for each said container normally lying substantially flush with the lower fuselage surface, each said cover being openable by the impingement thereon of a bomb contained in said container, resilient means for holding each said door in a normally closed position, and releasable means centrally disposed at the upper end of each container, engageable with a tail portion of the bomb, for holding the bomb within the container.

2. In an aircraft fuselage, a plurality of elongated bomb containers arranged with their long axes in a substantially vertical attitude, the lower end of each container terminating substantially at the lower bounding surface of said fuselage and opening therethrough, a hinged cover for each said container normally lying substantially flush with the lower fuselage surface, each said cover being openable by the impingement thereon of a bomb contained in said container, resilient means for holding each said door in a normally closed position, and releasable means centrally disposed at the top of each container for holding a bomb, from its upper end, within each said container.

RALPH D. CARLETON.